United States Patent [19]
Rodriguez

[11] Patent Number: 5,450,325
[45] Date of Patent: Sep. 12, 1995

[54] ROUTE DIRECTIONS DISPLAY SYSTEM

[76] Inventor: Angel L. Rodriguez, 4219 Baker Ave. NW., Seattle, Wash. 98107

[21] Appl. No.: 848,308

[22] Filed: Mar. 9, 1992

[51] Int. Cl.$^6$ ............................................. G06F 15/50
[52] U.S. Cl. .................................. 364/444; 364/443; 364/424.01; 340/995
[58] Field of Search ............... 364/424.01, 424.04, 364/443, 444, 449, 468, 460, 561, 708, 709.1; 340/995

[56]      References Cited
       U.S. PATENT DOCUMENTS

| | | | |
|---|---|---|---|
| 3,898,563 | 8/1975 | Erisman | 324/166 |
| 4,007,419 | 2/1977 | Jasmine | 324/166 |
| 4,156,190 | 5/1979 | Chittenden et al. | 324/175 |
| 4,507,737 | 3/1985 | LaSarge et al. | 364/453 |
| 4,531,123 | 7/1985 | Tagami et al. | 340/995 |
| 4,570,227 | 2/1986 | Tanchi et al. | 364/444 |
| 4,638,448 | 1/1987 | Cuvelier et al. | 364/565 |
| 4,682,287 | 7/1987 | Mizuno et al. | 364/561 |
| 4,774,671 | 9/1988 | Itoh et al. | 364/449 |
| 4,819,174 | 4/1989 | Furuno et al. | 364/444 |
| 4,862,395 | 8/1989 | Fey et al. | 364/561 |
| 4,881,187 | 11/1989 | Read | 364/565 |
| 4,976,424 | 11/1990 | Sargeant et al. | 272/73 |
| 4,977,509 | 12/1990 | Pitchford et al. | 364/449 |
| 4,992,947 | 2/1991 | Nimura et al. | 364/444 |
| 4,999,783 | 3/1991 | Tenmoku et al. | 364/450 |
| 5,016,007 | 5/1991 | Iihoshi et al. | 364/449 |
| 5,031,104 | 7/1991 | Ikeda et al. | 364/449 |
| 5,043,902 | 8/1991 | Yokoyama et al. | 340/995 |
| 5,121,326 | 6/1992 | Moroto et al. | 364/449 |
| 5,172,321 | 12/1992 | Ghaem et al. | 364/444 |
| 5,177,685 | 1/1993 | Davis et al. | 364/443 |
| 5,213,555 | 5/1993 | Hood et al. | 482/57 |
| 5,243,528 | 9/1993 | Lefebvre | 364/449 |

OTHER PUBLICATIONS

User manual for Polar CycloVantage, describing communication between Cyclocomputer and general purpose computer, 1989.
Pp. 66–70 from Jan., 1991, issue of American Bicyclist, showing features of currently available Cyclocomputers.

*Primary Examiner*—Kevin J. Teska
*Assistant Examiner*—Susan Wieland
*Attorney, Agent, or Firm*—Graybeal Jackson Haley & Johnson

[57]         ABSTRACT

A cyclocomputer for use on a bicycle displays route instructions stored in the cyclocomputer, displays two dimensional graphs on the face of the cyclocomputer, and is capable of exporting and importing information to and from other computers or cyclocomputers. The route instructions may be displayed with symbols such as left arrow, right arrow and up arrow or with alphanumeric characters. The displayed instruction is advanced to the next instruction automatically when a predetermined distance has been measured by the odometer or by the press of a button. Button presses may advance or review the displayed instructions. The distance to the next instruction point is constantly displayed. Importing information may be accomplished with an infrared link which communicates to many cyclocomputers at one time. Recorded data, such as speed, pedal cadence, or heart rate, may be displayed over distance or time, with the graphs being marked for each instruction point.

26 Claims, 8 Drawing Sheets

ROUTE DIRECTIONS DISPLAY SYSTEM

BACKGROUND OF THE INVENTION

This invention relates to an improvement for low power electronic microcomputer odometer/speedometers for bicycles which allows the devices to display route directions.

State of the art odometer/speedometer devices for bicycles are wrist watch size devices with wire connections to small sending units which sense revolutions of a wheel. The device includes an electronic clock for calculating speed. The history of development of these odometer/speedometer devices for bicycles is described in U.S. Pat. No. 4,156,190. U.S. Pat. No. 4,638,448 describes some of the more recently invented features of such devices.

According to contemporary bicycle industry magazines, these devices are now referred to as "cyclocomputers". Data that can be displayed on various cyclocomputers includes: current speed, maximum speed, average speed, total distance, trip distance, total time, trip time, clock time, stop watch functions, and countdown timer. With additional internal electronics, some cyclocomputers can also display altitude, rate of climb or descent, and temperature. With additional sensors located at the crank or on the rider, some cyclocomputers can display pedaling cadence, whether cadence is above or below a set point, heart rate, whether heart rate is above or below a set point, and total time that heart rate is within target zones. Various cyclocomputers feature audio beeps or synthesized voice cues to report some of this information to the rider. Various cyclocomputers can record any of the above data and replay the recorded data on the instrument face. At least one of them can also export this data to a computer for further analysis or display. The odometer function of each cyclocomputer requires calibration to the wheel size of the bicycle. This is accomplished by pressing buttons on the cyclocomputer, and either riding the bicycle over a measured distance or inputting the wheel size.

Many cyclists tour for pleasure and enjoy discovering new routes that they have not previously ridden. Cycling clubs and cycling magazines frequently publish route descriptions, either in map form or a sequence of written instructions, for others to follow. The cyclist typically carries the instructions in paper form in a pocket and occasionally stops to consult the instructions, an inconvenient process.

SUMMARY OF THE INVENTION

The present invention displays biking route instructions on the screen of the cyclocomputer. The displayed instruction is advanced to the next instruction by automatic means such as when an odometer measures a certain distance from the last instruction point or from the start of the route, or by user activated control such as a command button. The distance number for triggering the automatic display of the next route instruction can be entered by pressing buttons on the cyclocomputer, by recording a number measured by the odometer when the route is ridden by the route designer and a button is pressed at the instruction point, or by importing the distance numbers for a predesigned route from another computer. The route instructions may be entered at the cyclocomputer with button presses or communicated from another computer, either a general purpose computer or another cyclocomputer.

Because each instruction point is associated with a distance number and the odometer is measuring distance, the cyclocomputer is preferably programmed to display the remaining distance to the next instruction point. In addition, the preferred cyclocomputer program generates a prompt at a certain predetermined time from the next instruction point using the bicycle speed and the distance remaining to calculate the time. In alternative embodiments, the prompt may be in the form of a visual cue on the display, an audio voice cue, or other sensory signal.

Once a set of route instructions with distance numbers is loaded into the cyclocomputer, the wheel size calibration number stored in the memory of the cyclocomputer can be revised to be more accurate upon command from the rider. If, when the rider reaches an instruction point after the starting point, the next instruction does not appear automatically at the correct point, the rider can press buttons to instruct the cyclocomputer to consider the distance traveled to be the same as the distance number from the instruction set and recalibrate the correct wheel size accordingly. The same feature can be used to empirically calibrate the wheel size by entering a set of route instructions with two instruction points a known distance apart, such as one mile, and then riding the known distance, typically a measured mile along a road or bicycle path. Appropriate button presses at the beginning and end of the measured distance will produce a highly accurate, empirically measured, wheel size calibration.

The invention also allows route instructions and distance numbers for each instruction to be imported from a general purpose computer or another cyclocomputer. In an alternative embodiment, wheel size calibration information may also be imported. The importing link may be established with electrical wires between the devices or by electromagnetic communication, such as infrared or radio. In a preferred form of the invention infrared is employed, and the information can be imported to many cyclocomputers at one time all in close proximity to the transmitter for loading a batch of cyclocomputers all with the same route instructions.

Another aspect of the invention allows information such as distance numbers associated with each instruction point, route instructions, and data gathered from a ride, such as speed/time or altitude/distance, to be exported from a cyclocomputer to a general purpose computer for editing, analysis, display, or re-exporting to other cyclocomputers. The information transfer can also be made directly from one cyclocomputer to another.

A still further aspect of the invention allows data contained within the cyclocomputer to be displayed in a two dimensional graph on the face of the computer, by the use of an x y coordinate addressable LCD display. The locations of points associated with each route instruction are displayed on the graphs.

DETAILED DESCRIPTION

In the preferred embodiment, route instructions are edited and formatted on a personal computer to appear as line by line instructions on the cyclocomputer 1. For a cyclocomputer that can display 25 characters on a line, an example of an edited set of route instructions as it appears on the screen of a personal computer would be:

| DUCKS RIDE | | |
|---|---|---|
| 0.0 | ST | GAS WORKS PARK |
| 0.0 | L | PACIFIC AV N |
| 1.2 | R | STONE WAY |
| 3.4 | C | STONE WAY |
| 5.6 | L | 50TH ST |
| 6.8 | RY | PHINNEY AV |
| 11.7 | R | YESLER WY |
| 12.1 | * | GOOD EATS HERE |
| 13.7 | X | GREEN LAKE WY N |
| 15.8 | R | N 34TH ST |
| 19.6 | L | GAS WORKS PARK |

In the above example, ST means start, R means turn right, L means turn left, RY means go right at the Y, X means cross, C means continue, and asterisk means point of interest.

The buttons on the cyclocomputer 2 can be used to generate all the characters required for the route instructions. Because it is inconvenient for the user to scroll through 40 different alpha numeric characters, when selecting the direction abbreviation designation as shown above (R, L, ST, RY, LY, X, or C), the interface scrolls through merely this list of designations. An alternative embodiment might simply allow a right arrow, a left arrow, and a straight up arrow as a set of designations which is simple to scroll through and select.

Whether the route instructions are created at the cyclocomputer or imported from another computer, the number of instructions is limited only by the available memory in the cyclocomputer.

Figure 8:
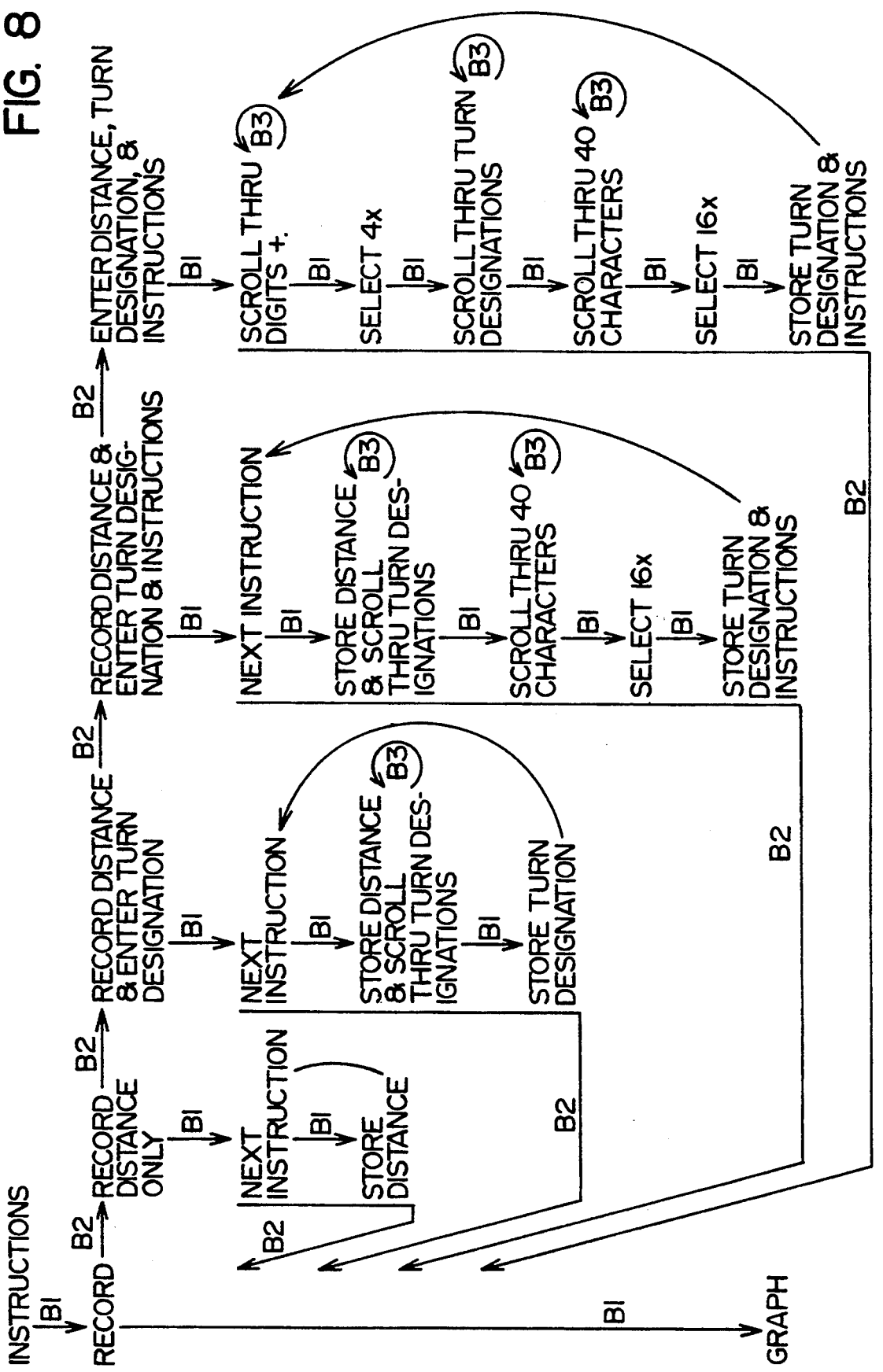
FIG. 8 shows the use of user control buttons to access all of the subsidiary functions within the Record function.

In the preferred embodiment, the cyclocomputer includes a feature which allows the distance from one instruction point to the next to be measured when the route is ridden by the route describer. See FIG. 8. The route describer pushes a button at each instruction point to record in the memory of the cyclocomputer the distance from the last instruction point and/or the total distance from the starting point. This data on distances for each instruction point may then be exported to the general purpose computer for editing and formatting to create a complete set of route instructions. The instruction point distance numbers and/or the instructions may also be transferred from one cyclocomputer to another.

Figure 7:
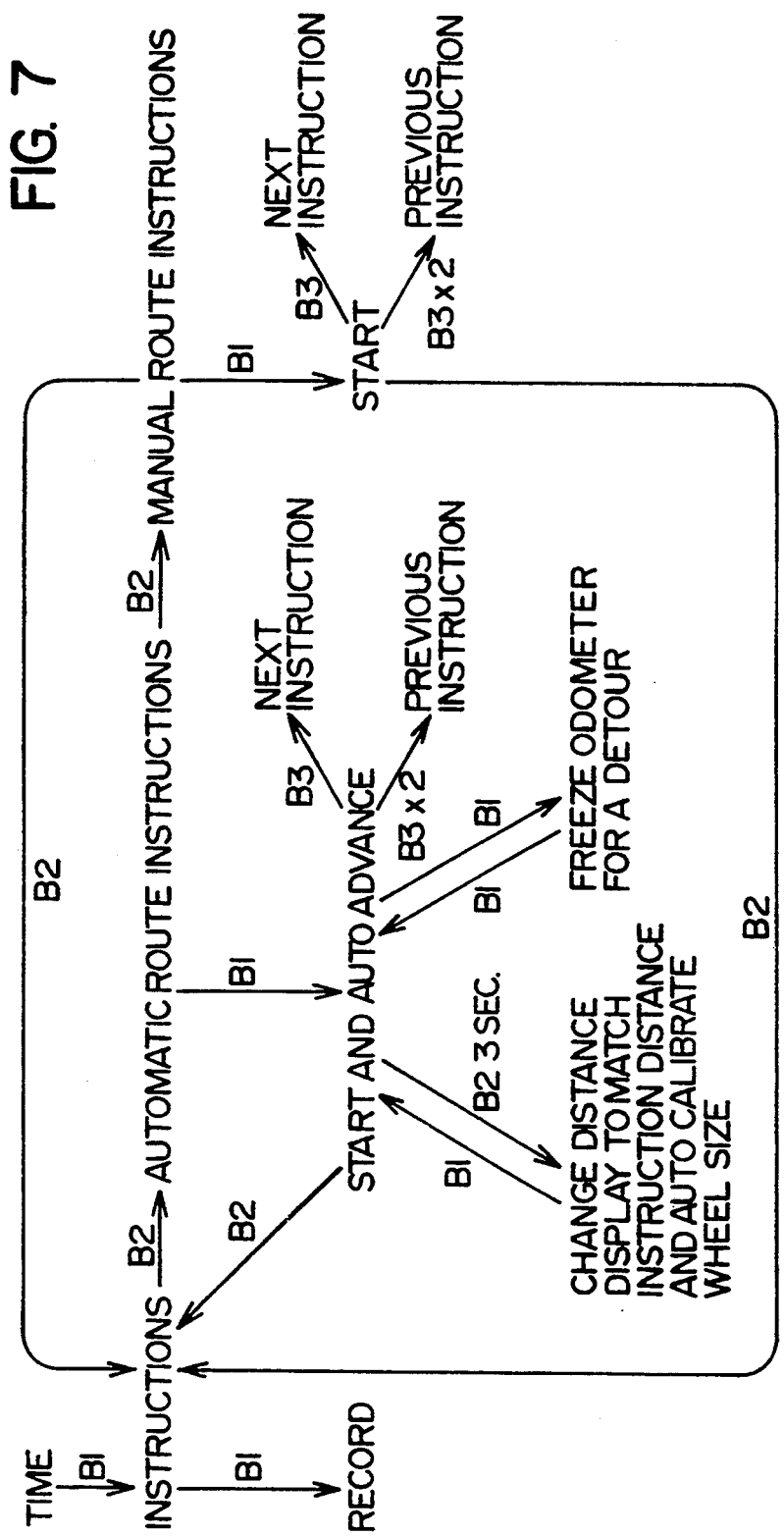
FIG. 7 shows the use of user control buttons B1, B2, and B3 to access the subsidiary functions within the Instructions function. B3×2 indicates two quick presses in succession of button B3, and B2 3 sec. indicates a three second press of button B2.

Once a cyclocomputer is loaded with the route instructions, the rider initiates the ride with the push of a button 2. See FIG. 7. The computer displays the first ride instruction, typically a starting location. The rider again pushes a button 2 when the bicycle is at that location to start the trip odometer at zero. At any point, if the rider takes a side trip or a shortcut, or if the distance measurement from either the odometer or the stored route instructions is inaccurate, the rider can reset the trip odometer to the appropriate point by pressing a button 2 when the bicycle is along side an instruction point.

If the rider believes that the route instructions contain an accurate distance and his wheel size calibration is inaccurate, he can press a button which instructs the cyclocomputer to recalibrate the wheel size so that the reported odometer distance will match the distance stated in the route instructions. See FIG. 7.

Figure 10:
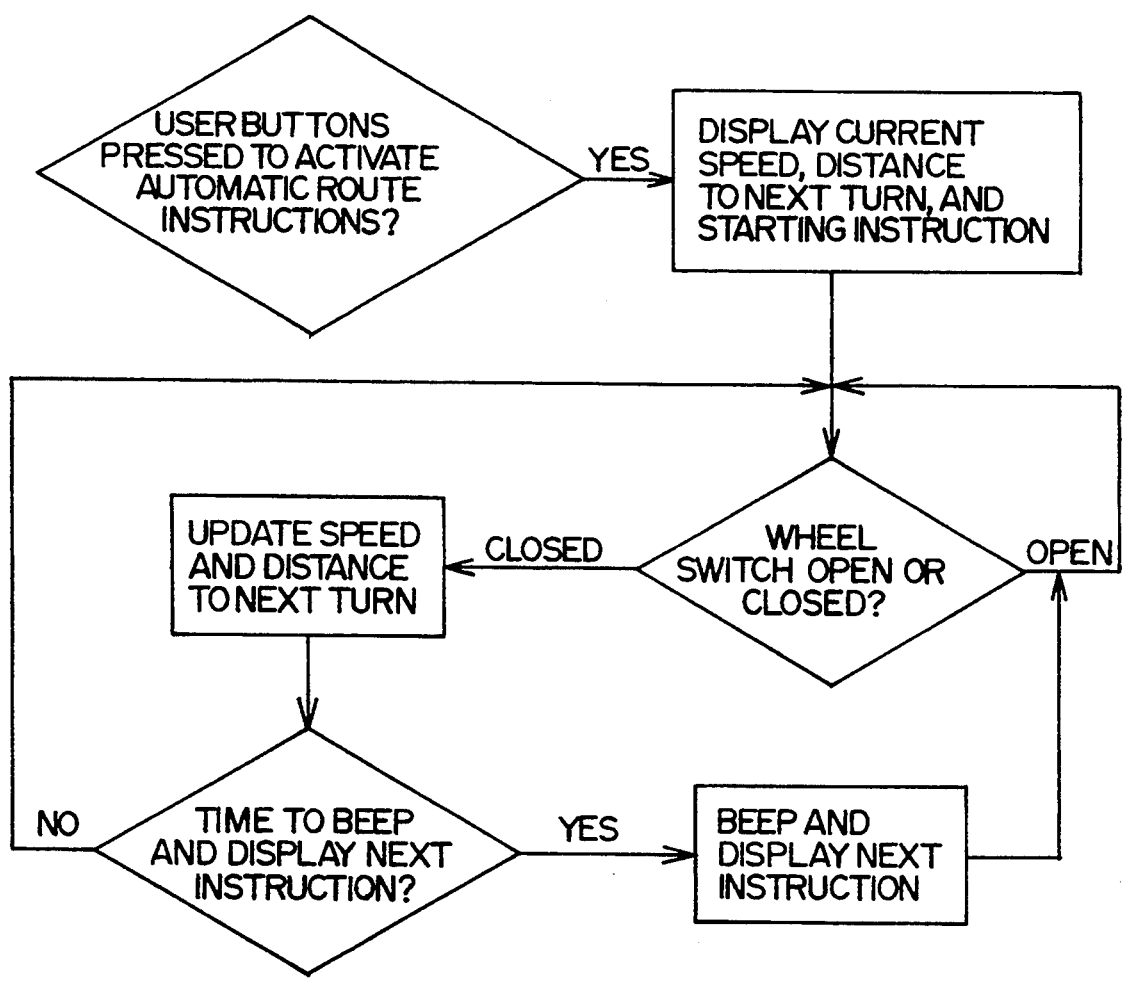
FIG. 10 shows the logic flow for the display and updating of route instructions.

To tell the rider when the next instruction point will be reached, in the preferred embodiment, the display indicates the distance remaining to the instruction point 3. One can watch this number approach zero and be forewarned accordingly. See FIG. 10. Also, the device will make a warning sound one or more preset times (calculated with current speed 4) from the instruction point. Alternatively, the device might play a synthesized voice prompt to alert the rider that an instruction point is coming up soon and it might further state the turn instructions in a synthesized voice, such as "right" or "left". In an alternative embodiment, the prompt which indicates that an instruction point is approaching is based on remaining distance rather than remaining time.

In the preferred embodiment, once the instruction point is reached as measured by the odometer, the next instruction will automatically appear. See FIG. 10. Alternatively, if the cyclocomputer has no odometer function or the odometer is not working, the arrival at an instruction point can be communicated by the rider to the cyclocomputer by the press of a button 2, thereby advancing to the next instruction. See FIG. 7. At any time, the rider can scroll forward or backwards through the instructions, by pressing buttons.

Using an LCD display, the screen of the cyclocomputer is addressable with x and y coordinates. Alternative embodiments can be built with a gas plasma display or any other small, flat panel display technology. During a ride, the cyclocomputer records time and distance as well as information about the ride such as speed, cadence, and, with appropriate sensors, heart rate, altitude, or temperature. Using the x y addressable display, any of these items can be displayed over time or over distance. Each of the instruction points 5 shows on the graph. The data from any number of rides remains stored in the cyclocomputer for later display or exporting, limited only by memory. When the graph is displayed, the programmed logic chooses an appropriate scale with appropriate starting points and ending points for each axis. The selected scales are then displayed 8.

In an alternative embodiment, the cyclocomputer might be designed so that trip data can only be accumulated in the cyclocomputer from an actual ride and not by pressing of buttons or importing from a computer. Then each cyclocomputer could be used to record information from competitions and officials who are not riding in the race would not be required.

Figure 9:
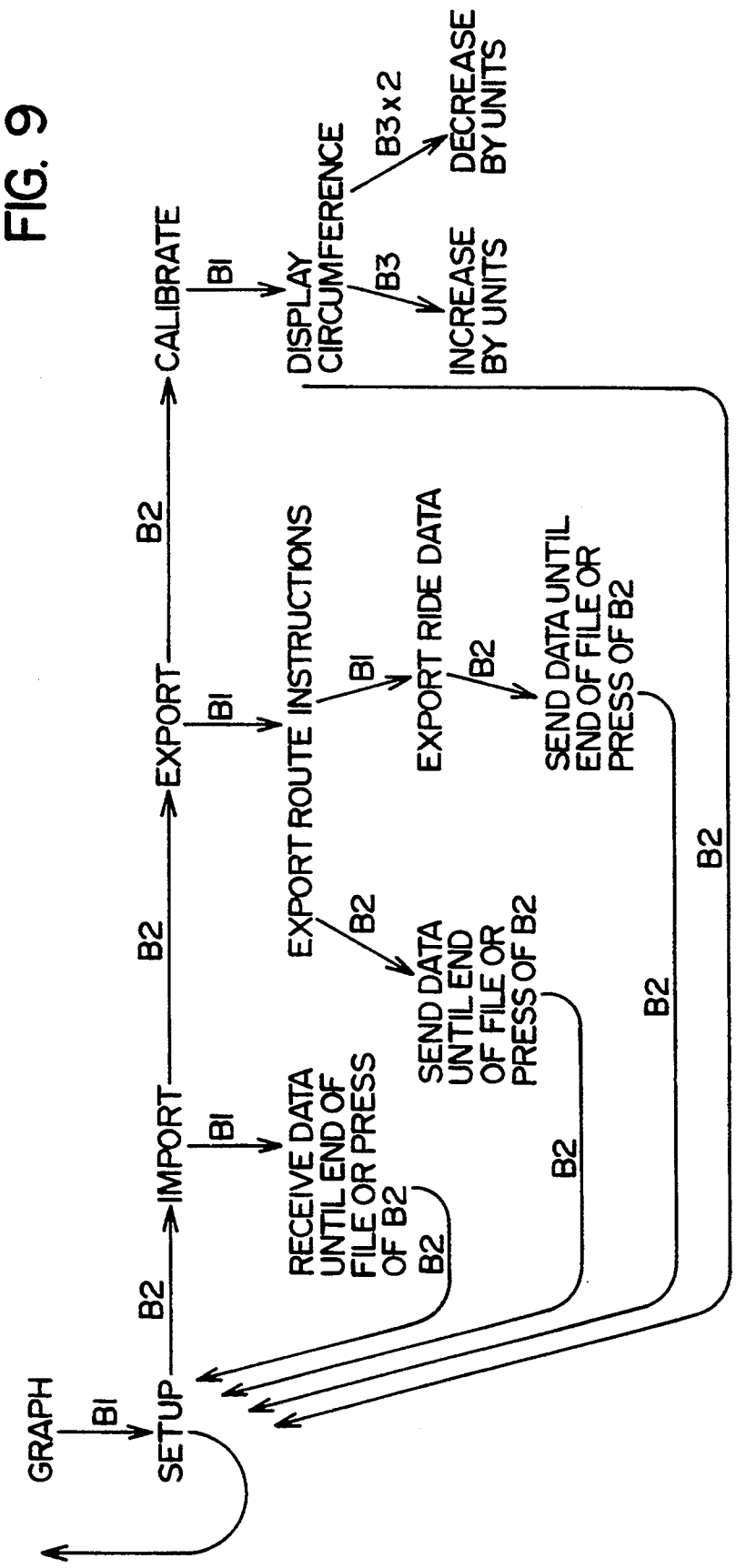
FIG. 9 shows the use of user control buttons to access all of the subsidiary functions within the Setup function.

At the end of a ride, whether a pleasure tour, a training ride, or a competition, recorded data from the ride can be exported to a computer to be manipulated or analyzed for various purposes. See FIG. 9. One such purpose might be the comparison of data from various competitors to determine winners. Another would be the creation of a personal tour log or training record. A third might be to modify the route instructions or distance numbers for subsequent importing to one or more cyclocomputers for future rides on the same route.

In the preferred embodiment, at least two lines are available for route instructions so the instructions 1 can be long and detailed. If the instruction or similar comment is longer than this, or in an alternative embodiment, where only one line is available, additional lines of an instruction can be displayed by pressing a button 2.

Communication with other general purpose computers or cyclocomputers for exporting or importing information can be accomplished either with a multiple wire connection 6 or by radio or infrared electromagnetic radiation. The preferred embodiment uses infrared which is transmitted and received with an I/R photo-emitter diode and an I/R sensor diode located behind a small window on the cyclocomputer 7. Such infrared communication means are well known for remote television transmitters and other communications between devices such as electronic name, address and telephone number record systems. Using infrared means, communication between cyclocomputers can be accomplished by placing them adjacent to each other. In addition, an infrared transmitter 9 plugged into an RS 232 serial port of a general purpose computer 10 can be placed in a location where it can transmit to many bicycle cyclocomputers all at one time, allowing all of the cyclocomputers to be loaded with route descriptions all at one time.

In the preferred embodiment, the cyclocomputer can be set so that importing from a computer requires a password to prevent others from intentionally or inadvertently changing the route instructions or other stored information in the cyclocomputer.

All of the components required to build the invention are well known. Wheel rotation and crank rotation sensors, preferably consisting of a magnet 11 mounted on the spokes and a reed switch 12 mounted on the forks, are widely available in the market place, as are heart rate, temperature, and altitude sensors. All of these have been incorporated into cyclocomputers that are widely available. X Y addressable LCD displays are commonly available in pocket calculators and other small electronic devices. Infrared transmitting and receiving windows are well known in small electronic devices as are plugs and jacks for connecting multiple wires for direct wire connection. Microprocessors and non-volatile memories are well known in cyclocomputers and other electronics. Programming of the features and the computations required to implement the above described features is straight forward and could be accomplished by any trained programmer. Placement of voice synthesizer electronics and a speaker is described in U.S. Pat. No. 4,638,448.

Figure 1:
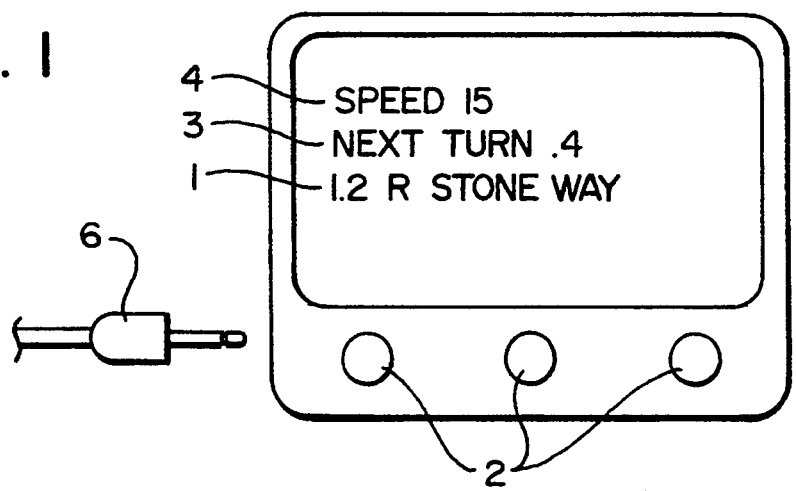
FIG. 1 is a front elevation of a cyclocomputer with a screen displaying an instruction, the distance to the next instruction point, and the current speed. It also shows a form of wire connection to either a general purpose computer or another cyclocomputer.
Figure 2:
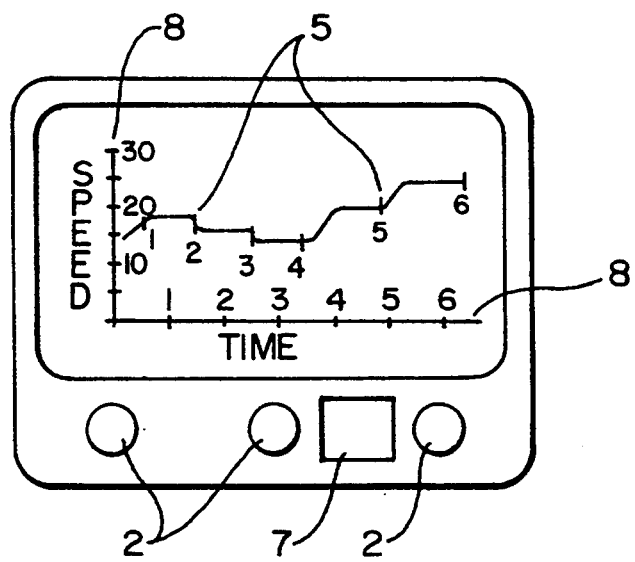
FIG. 2 is a view of an alternative embodiment of the cyclocomputer of FIG. 1 with the screen showing a two dimensional graph of speed over time. The graph is marked to show each instruction point. The embodiment of FIG. 2 also shows a sensor/transmitter window for communicating via infrared radiation with another general purpose computer or cyclocomputer.
Figure 3:
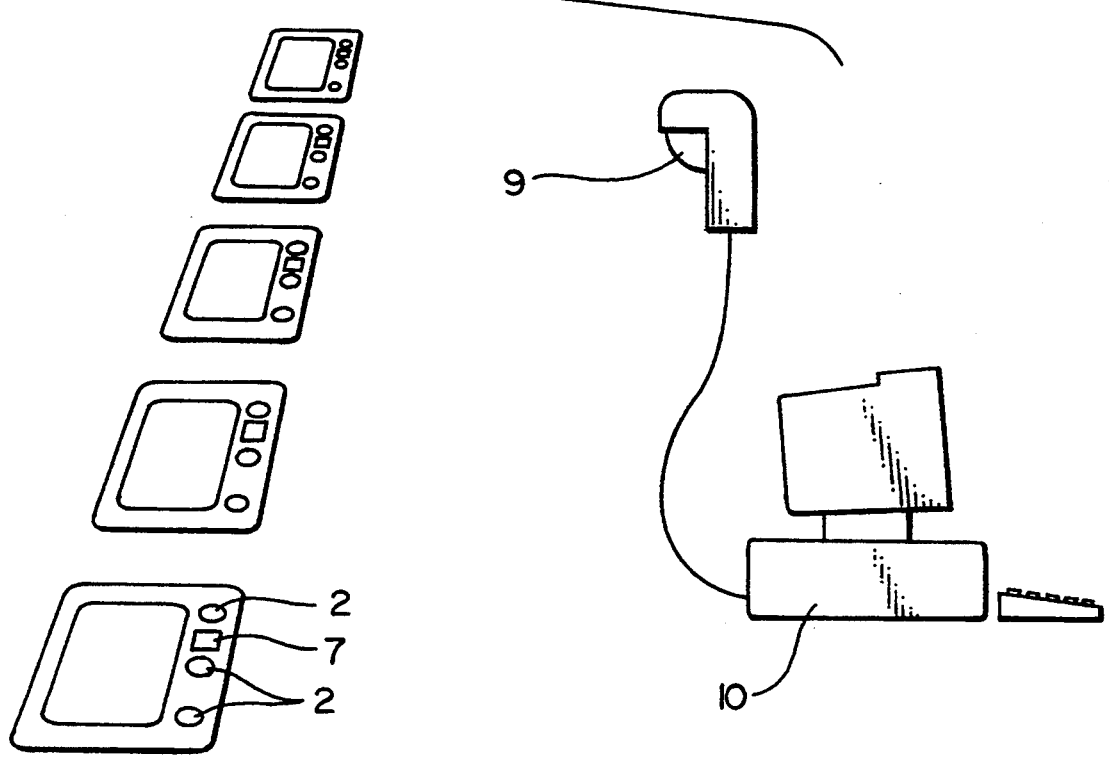
FIG. 3 shows a plurality of cyclocomputers like that shown in FIG. 2 positioned for receiving instructions or other data simultaneously from a single infrared transmitter connected to a personal computer.
Figure 4:
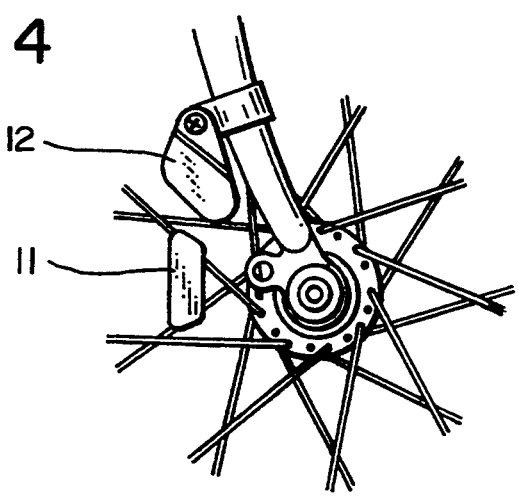
FIG. 4 shows the wheel rotation sensor including a magnet and magnetic sensitive reed switch.
Figure 5:
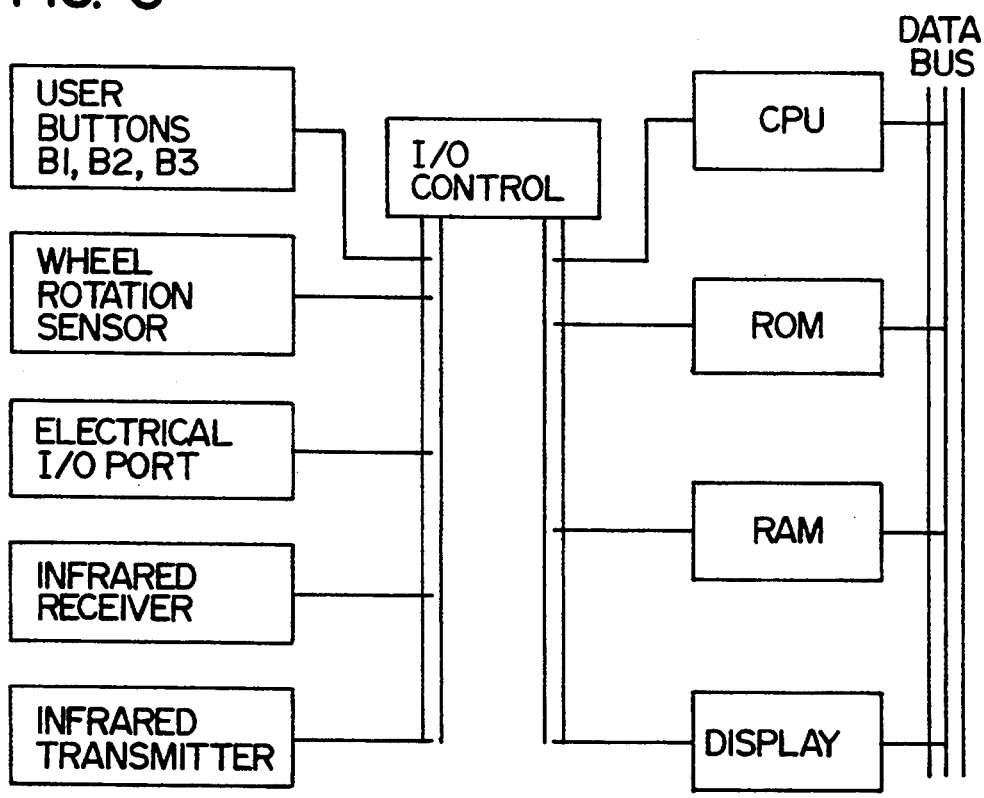
FIG. 5 shows a block diagram of the electronic components. It is a typical design for a cyclocomputer except for the addition of the infrared receiver and transmitter.
Figure 6:
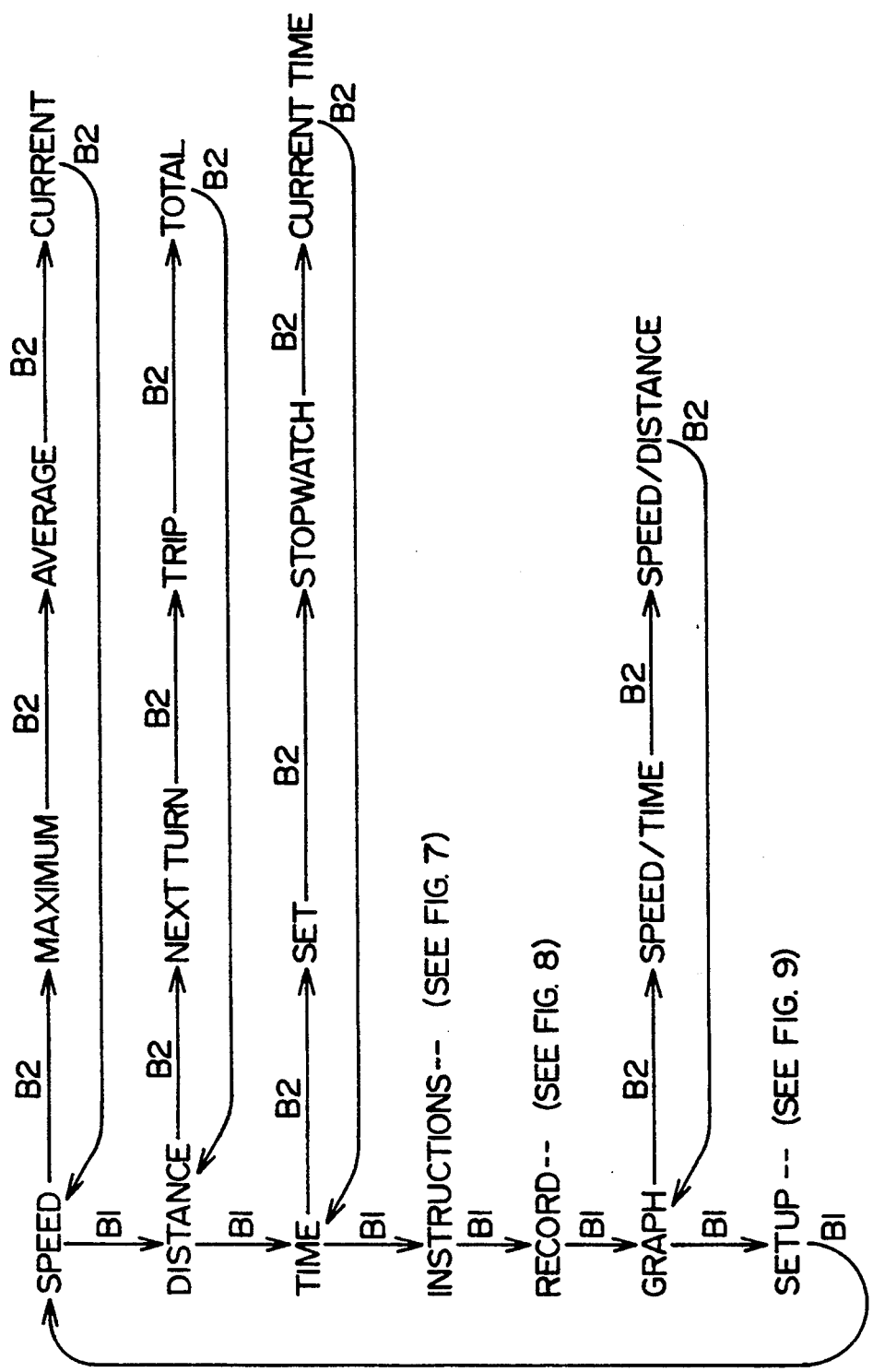
FIG. 6 shows the use of user control buttons B1 and B2 to access the principal functions and some subsidiary functions of the cyclocomputer. B1 indicates a press of the first user button and B2 indicates a press of the second user button.

The preferred embodiment for the cyclocomputer is relatively small, with a screen of about 2" by 1", and a small number of buttons, as shown in FIGS. 1 and 2. It is created with existing components and a custom made case. An alternative embodiment has been created using a pocket sized general purpose computer with an x y addressable LCD display, specifically, the Hewlett Packard HP95LX. The computer has been programmed to communicate through an RS 232 serial port to the reed switch 12 for counting wheel rotations. For importing or exporting data, the HP95LX has an infrared communications window.

Some of the uses of the disclosed cyclocomputer include the following. Riders in a new area may go to a local bike shop to import into their cyclocomputer one or more routes to ride. Book publishers may include a disk with routes ready to load into a general purpose computer and export to the cyclocomputer. Bicycle tour companies may export the day's ride to all of the tour participants. Bicycle clubs may publish recommended rides on a computer bulletin board for importing into a general purpose computer with a modem and then exporting to the cyclocomputer. To promote bicycle tours, government tourism departments may send prospective visitors route descriptions on disk. Friends may share routes that they have developed. Magazines may publish routes in a printed format suitable for entry into a general purpose computer or directly into a cyclocomputer.

Numerous alterations and modifications of the embodiments described above will become apparent to those skilled in the art after having read the above disclosure. It is therefore intended that the following claims be interpreted to cover all such alterations and modifications as fall within the true spirit and scope of the invention.

I claim:

1. An odometer for use on a wheeled vehicle comprising:
   (a) means for sensing each rotation of a rotating part which rotates a fixed number of times with each rotation of a wheel;
   (b) means for counting sensations of rotation;
   (c) means for causing the odometer to begin counting sensations of rotation;
   (d) means for inputting to the odometer the distance travelled from the commencement of counting sensations of rotation; and
   (e) means for using the distance travelled and number of rotations counted over that distance to subsequently calculate a second distance travelled from a second counted number of sensations of rotation.

2. A device for storing predetermined route instructions and communicating them to a bicycle rider, comprising:
   (a) a housing for mounting on a bicycle;

(b) means within the housing for storing the predetermined route instructions and, associated with each route instruction, a distance value;
(c) means within the housing for communicating a predetermined route instruction to the rider;
(d) odometer means;
(e) means for comparing the stored distance value with distance measured by the odometer; and
(f) means for advancing the communicated instruction to the next predetermined route instruction when the comparison between the measured distance and the stored distance value reaches a certain number.

3. The device of claim 2 wherein the means for communicating the route instruction comprises:
(a) means for announcing an audio instruction.

4. The device of claim 2 wherein the housing has a display and the means for communicating the route instruction comprises:
(a) means for displaying the communicated instruction on the display.

5. The device of claim 2, further comprising:
(a) means responsive to the odometer for calculating the current speed;
(b) means for calculating the remaining distance to the next instruction point; and
(c) means for calculating and communicating the remaining time to the next instruction point at the current speed.

6. The device of claim 5, wherein the means for communicating the remaining time to the next instruction point comprises:
(a) means for announcing one or more sounds at one or more predetermined times prior to expected arrival at the next instruction point at the current speed.

7. The device of claim 5, wherein the housing has a display and the means for communicating the remaining time to the next instruction point comprises:
(a) means for displaying on the display one or more visual symbols at one or more predetermined times prior to expected arrival at the next instruction point at the current speed.

8. The device of claim 2, further comprising:
(a) means for calculating and communicating the remaining distance to the next instruction point.

9. The device of claim 8, wherein the housing has a display and the means for communicating the remaining distance to the next instruction point comprises:
(a) means for displaying on the display the remaining distance to the next instruction point.

10. The device of claim 2, further comprising:
(a) means for obtaining from the odometer a measured distance value and storing it as the stored distance value.

11. The device of claim 10, further comprising:
(a) means for entering route instructions and storing them as the stored route instructions.

12. The device of claim 11, further comprising:
(a) means for exporting the stored route instructions to a computer.

13. The device of claim 10, further comprising:
(a) means for exporting the stored distance values to a computer.

14. The device of claim 2, further comprising:
(a) importing means for importing route instructions from a computer to be stored in the route instructions storage means.

15. The device of claim 14, wherein the importing means comprises:
(a) a plurality of electrical wires.

16. The device of claim 14, wherein the importing means comprises:
(a) transmitting means, coupled to the computer, for transmitting electromagnetic radiation through free space; and
(b) means, coupled to the cyclocomputer, for receiving the transmitted electromagnetic radiation.

17. The device of claim 2, further comprising:
(a) importing means for importing information from a computer; and
(b) storage means for storing the imported information.

18. The device of claim 17, wherein the importing means comprises:
(a) transmitting means, coupled to the computer, for transmitting electromagnetic radiation through free space; and
(b) means, coupled to the storage means, for receiving the transmitted electromagnetic radiation.

19. The device of claim 17, wherein the information comprises:
(a) information for calibrating an odometer function to the wheel size.

20. The device of claim 17, wherein the information comprises:
(a) route instructions.

21. The device of claim 17, wherein the importing means comprises:
(a) a plurality of electrical wires.

22. A cyclocomputer for a bicycle comprising:
(a) a display to present two dimensional graphs showing variation of one of the variables, speed, altitude, cadence, heart rate, and air temperature as a function of one of: (1) time elapsed and (2) distance travelled by the bicycle on the face of the cyclocomputer; and
(b) means for displaying on the graphs a plurality of point locations each associated with a route instruction.

23. The device of claim 22, further comprising:
(a) means for storing a sequence of predetermined route instructions;
(b) means for displaying a predetermined route instruction on the face of the cyclocomputer; and
(c) means for advancing the displayed predetermined instruction to the next predetermined instruction.

24. A device comprising the combination of a cyclocomputer with:
(a) a communication link to import information from a computer to be stored in the cyclocomputer, the information comprising information for calibrating an odometer function to the wheel size, the communication link including:
(a1) a plurality of electrical wires;
(a2) transmitting means, coupled to the computer, for transmitting electromagnetic radiation through free space, the transmitting means further including means for transmitting to a plurality of receivers all at one time; and
(a3) means, coupled to the cyclocomputer, for receiving the transmitted electromagnetic radiation.

25. A device for storing a sequence of predetermined route instructions and communicating them to a bicycle rider, comprising:

(a) a housing for mounting on a bicycle;
(b) means within the housing for storing the predetermined route instructions;
(c) means within the housing for communicating a predetermined route instruction to the rider; and
(d) means for advancing to the next predetermined route instruction;
(e) importing means for importing information from a computer, the importing means including:
   (e1) transmitting means, coupled to the computer, for transmitting electromagnetic radiation through free space; and
   (e2) means, coupled to the storage means, for receiving the transmitted electromagnetic radiation; and
(f) storage means for storing the imported information.

26. A device for storing a sequence of predetermined route instructions and communicating them to a bicycle rider, comprising:
(a) a housing for mounting on a bicycle;
(b) means within the housing for storing the predetermined route instructions;
(c) means within the housing for communicating a predetermined route instruction to the rider;
(d) means for advancing to the next predetermined route instruction, the means for advancing the instruction including:
   (d1) odometer means;
   (d2) means for storing a distance value associated with each route instruction;
   (d3) means for comparing the stored distance value with distance measured by the odometer and producing a comparison value; and
   (d4) means for advancing the communicated instruction to the next instruction when the comparison value reaches a certain number; and
(e) importing means for importing route instructions from a computer to be stored in the route instructions storage means, the importing means including:
   (e1) transmitting means, coupled to the computer, for transmitting electromagnetic radiation through free space to a plurality of receiver means all at one time; and
   (e2) means, coupled to the cyclocomputer, for receiving transmitted electromagnetic radiation.

* * * * *